T. DAVIDENIA.
POTATO PLANTER.
APPLICATION FILED JUNE 15, 1920.

1,403,739.

Patented Jan. 17, 1922.
2 SHEETS—SHEET 1.

Inventor
Terentie Davidenia
By his Attorney
George C. Heinicke

T. DAVIDENIA.
POTATO PLANTER.
APPLICATION FILED JUNE 15, 1920.
1,403,739.
Patented Jan. 17, 1922.
2 SHEETS—SHEET 2.
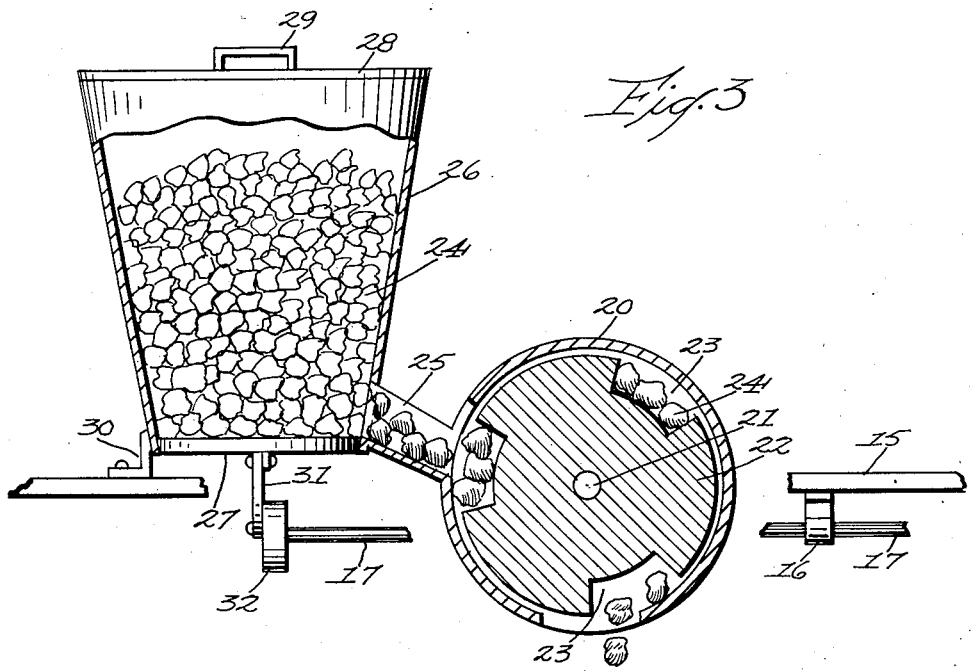
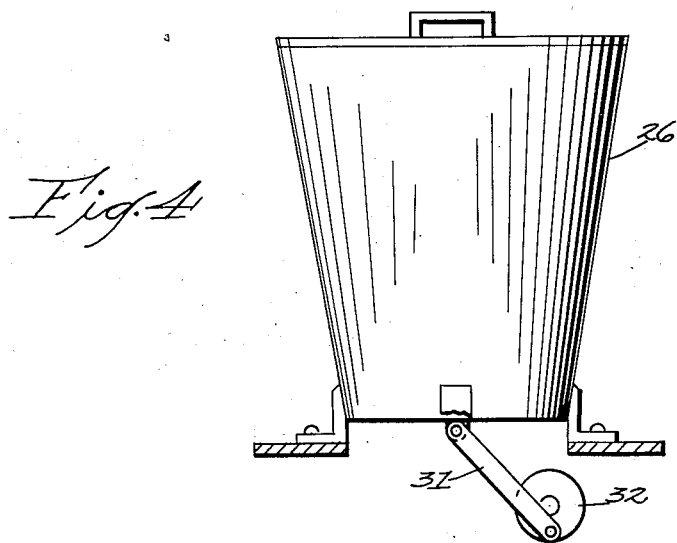
Inventor
Terentia Davidenia
By his Attorney
George C. Heinicke

UNITED STATES PATENT OFFICE.

TERENTIE DAVIDENIA, OF DETROIT, MICHIGAN.

POTATO PLANTER.

1,403,739.  Specification of Letters Patent.  Patented Jan. 17, 1922.

Application filed June 15, 1920. Serial No. 389,150.

*To all whom it may concern:*

Be it known that I, TERENTIE DAVIDENIA, a citizen of Russia, residing at Detroit, county of Wayne, and State of Michigan, have invented certain new and useful Improvements in Potato Planters, of which the following is a specification.

This invention relates generally to improvements in agricultural machines, and more particularly to a machine adapted for use in planting potatoes or the like by means of which the potatoes may be dropped and covered rapidly, thoroughly and regularly.

Another object of the invention is to provide a planter of the type in question which will drop a predetermined quantity of the seed potatoes, throw hills about the same and level the top of these hills.

The invention consists in the construction and combination of the various parts of the machine as hereinafter more fully described.

That others may fully understand my invention, I will particularly describe it with reference to the accompanying drawings, in which—

Figure 3 shows a detail view of the hopper and seed distributor, partly in section.

Figure 4 is a side view of the hopper and the means for shaking its bottom.

Figure 1:
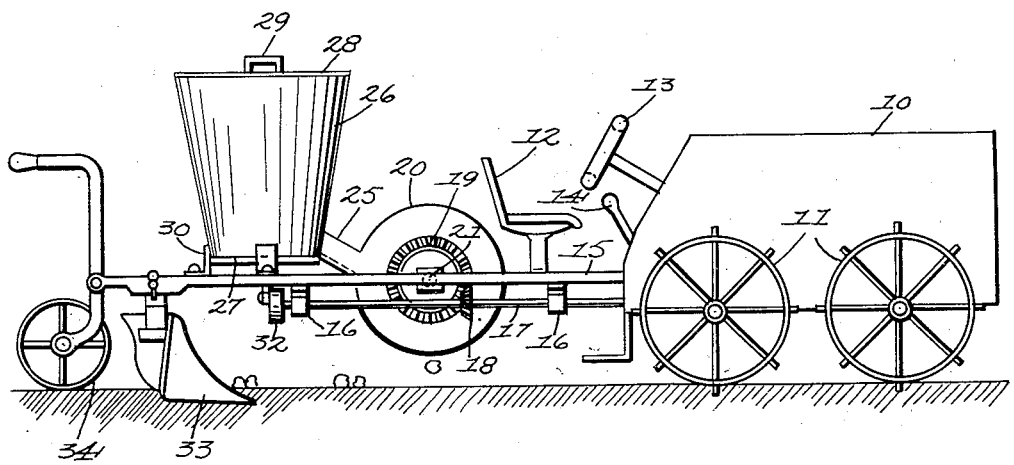
Figure 1 is a side elevation of a machine constructed according to my invention.
Figure 2:
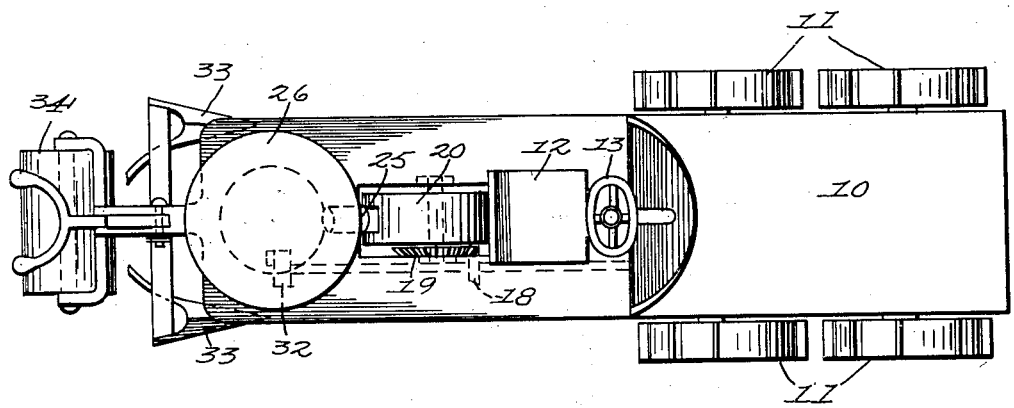
Figure 2 is a top plan view thereof.

As illustrated, my device comprises a motor vehicle 10 mounted on the traction wheels 11 and provided with a seat 12 for the operator steering means 13, and braking means 14.

To the bottom 15 of the vehicle 10 hangers 16 are secured for a shaft 17 adapted to be rotated from the motor of the vehicle and carrying behind the driver's seat a bevel gear 18 in mesh with a miter gear 19 on the outer face of a housing or casing 20 provided in an opening in the bottom plate 15. On the shaft 21 of the miter gear, within the housing 20 a distributing wheel 22 is arranged having a plurality of pockets 23 for the reception of the seed potatoes 24. The casing 20 communicates by means of a short tube 25 with a hopper 26 through which the potatoes from the hopper are fed to the wheel. The hopper 26 has a movable bottom 27, and a removable cover 28 with a handle 29. Brackets 30 secure the hopper to the bottom of the vehicle. To the underside of the hopper bottom a link 31 is secured which is operated by means of a disc 32 at the end of the shaft 17 so that a shaking movement is imparted to the bottom upon the operation of the shaft 17. Hilling plow shares 33 are secured to the side edge of the bottom 15 behind the hopper and are adapted to throw hills over the potatoes planted by the distributor during the travel of the vehicle over the ground, and at the rear of the vehicle a roller 34 is arranged adapted to level the top of the hills.

Changes may be made in the minor parts of my device and the combination thereof without departing from the scope and spirit of my invention.

Having thus described my invention, what I claim as new and desire to secure by Letters Patent of the United States is—

1. A seed potato dispensing device of the character described comprising a power shaft, seed distributing means adapted to be operated from said shaft, a hopper for feeding the seed potatoes to said distributing means, a shaker bottom for said hopper, and means operated from said shaft for shaking said hopper bottom.

2. A seed potato dispensing device of the character described, comprising a power shaft, a seed distributing means adapted to be operated from said shaft, said means comprising a wheel, pockets in the periphery of said wheel, means for operating said wheel upon the operation of said shaft, a hopper for the seed potatoes, a channel through which the potatoes are guided from said hopper into said pocket wheel, a shaker bottom for said hopper, and means for operating said hopper bottom upon the operation of said seed distributing means by said shaft.

In testimony whereof I have affixed my signature.

TERENTIE DAVIDENIA.